(12) United States Patent
Chaffron et al.

(10) Patent No.: US 9,650,295 B2
(45) Date of Patent: May 16, 2017

(54) METHOD FOR PRODUCING AN AL/TIC NANOCOMPOSITE MATERIAL

(71) Applicant: COMMISSARIAT A L'ENERGIE ATOMIQUE ET AUX ENERGIES ALTERNATIVES, Paris (FR)

(72) Inventors: Laurent Chaffron, Villemoisson sur Orge (FR); Daniel Nunes, Saclay (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/760,391

(22) PCT Filed: Jan. 9, 2014

(86) PCT No.: PCT/EP2014/050322
§ 371 (c)(1),
(2) Date: Jul. 10, 2015

(87) PCT Pub. No.: WO2014/108470
PCT Pub. Date: Jul. 17, 2014

(65) Prior Publication Data
US 2015/0353424 A1 Dec. 10, 2015

(30) Foreign Application Priority Data
Jan. 11, 2013 (FR) ...................................... 13 50249

(51) Int. Cl.
*C04B 35/56* (2006.01)
*C04B 35/626* (2006.01)
(Continued)

(52) U.S. Cl.
CPC ............. *C04B 14/322* (2013.01); *C22C 1/058* (2013.01); *C22C 32/0052* (2013.01)

(58) Field of Classification Search
CPC ............. C04B 35/5611; C04B 35/5618; C04B 35/62615
See application file for complete search history.

(56) References Cited

U.S. PATENT DOCUMENTS 4,515,746 A * 5/1985 Brun ..................... C04B 35/111
264/332
4,539,141 A * 9/1985 Brun ..................... C04B 35/111
252/516
(Continued)

OTHER PUBLICATIONS

Yucel Birol, "Response to thermal exposure of the mechanically alloyed Al-Ti/C powders," Journal of Materials Science, vol. 42, No. 13, XP019503085, Apr. 26, 2007, pp. 5123-5128.
(Continued)

*Primary Examiner* — Erin Snelting
(74) *Attorney, Agent, or Firm* — Oblon, McClelland, Maier & Neustadt, L.L.P.

(57) ABSTRACT

The invention relates to a process for preparing an Al/TiC nanocomposite material comprising an aluminum matrix in which particles comprising nano-sized TiC are dispersed. It comprises:
 a) preparing a first powder mixture by contacting a graphite powder with a titanium aluminide powder of the formula $Al_3Ti$, both powders having micro- or higher sized particles;
 b) preparing a second powder mixture by mechanosynthesis of the first powder mixture, the second powder mixture being formed in all or part by particles comprising both titanium aluminide and graphite;
 c) compressing the second powder mixture to obtain one or more greens;
 d) reactively sintering the green(s), thereby the Al/TiC nanocomposite material is obtained.

15 Claims, 4 Drawing Sheets

(51) Int. Cl.
*C04B 14/32* (2006.01)
*C22C 1/05* (2006.01)
*C22C 32/00* (2006.01)

(56) References Cited

U.S. PATENT DOCUMENTS

| | | | | |
|---|---|---|---|---|
| 4,748,001 A | * | 5/1988 | Banerji | C22C 32/0084 420/129 |
| 5,114,505 A | * | 5/1992 | Mirchandani | C22C 1/1084 148/437 |
| 5,169,461 A | * | 12/1992 | Watwe | C22C 1/0416 148/437 |
| 5,171,381 A | * | 12/1992 | Mirchandani | C22C 1/0416 148/437 |
| RE34,262 E | * | 5/1993 | Benn | C22C 32/0036 148/437 |
| 2002/0051883 A1 | * | 5/2002 | Yadav | A61L 27/06 428/402 |
| 2009/0017332 A1 | * | 1/2009 | Kisi | C04B 35/4508 428/697 |
| 2009/0041609 A1 | * | 2/2009 | Duz | C22C 32/0047 419/12 |
| 2013/0034655 A1 | | 2/2013 | Lorrette et al. | |

OTHER PUBLICATIONS

B. Dikici, et al., "Synthesis of in situ TiC nanoparticles in liquid aluminum: the effect of sintering temperature," Journal of Composite materials, vol. 45, No. 8, XP055080196, 2011, pp. 895-900.

J.C. Viala, et al., "Diffusion paths and reaction mechanisms in the high-temperature chemical interaction between carbon and titanium aluminides," Materials Science and Engineering A, XP055080197, Nov. 15, 1995, pp. 222-237.

C. Suryanarayana, et al., "Mechanically alloyed nanocomposites," Progress in Materials Science, vol. 58, No. 4, XP055079434, 2013, pp. 383-502.

Yucel Birol, "In situ processing of $TiC_p$-Al composites by reacting graphite with Al—Ti melts," Journal of Materials Science, vol. 34, 1999, pp. 1653-1657.

T. Iseki, et al., "Some properties of sintered $Al_4C_3$," Journal of Materials Science, Letters 2, 1983, pp. 675-676.

International Search Report issued Apr. 17, 2014 in PCT/EP2014/050322 filed Jan. 9, 2014.

Preliminary French Search Report issued Sep. 20, 2013 in FR 1350249 filed Jan. 11, 2013.

* cited by examiner

METHOD FOR PRODUCING AN AL/TIC NANOCOMPOSITE MATERIAL

TECHNICAL FIELD

The present invention relates to a process for producing an Al/TiC nanocomposite material, that is a material comprising an aluminum matrix in which nano-sized TiC reinforcements are dispersed.

This process is in particular applicable in the fields of aeronautics and car industry.

STATE OF PRIOR ART

In the field of car industry and aeronautics, the manufacturers aim at obtaining light and resistant materials. However, most of the industrializable light materials have a very low strength.

This is the reason why the metal matrix composites (MMC), which comprise a metal matrix (metal or metal alloy) in which metal or ceramic reinforcements (particles, fibers, or else) are incorporated, are particularly appreciated. Indeed, the interest of the MMC with respect to the light alloys (based on aluminum, magnesium or titanium) is that they have very high E/ρ (elastic modulus/density) and σ/ρ (yield strength/density) ratios.

Among the MMC materials having a light alloy matrix, the Al/TiC composites, which are aluminum alloys reinforced by titanium carbide particles, are particularly interesting materials, because they combine ductility, electrical and thermal conductivity of the aluminum matrix, with mechanical strength, rigidity and hardness of the titanium carbide. This combination of properties makes Al/TiC composites particularly attractive for use in car industry and aeronautics, because besides their mechanical properties, they also allow for interesting weight savings.

Al/TiC composites also attract much attention because of the good thermochemical stability of the titanium carbide, which makes possible an in situ manufacture of these composites by methods of solidification from the liquid state starting from three constituent elements Al, Ti, C. However, making Al/TiC composites is not so simple.

Indeed, MMC materials which are obtained by solidification (agitation, infiltration . . . ) or by diffusion welding have manufacturing requirements (wettability problems of the reinforcements by the molten metal, difficulties in obtaining an homogenous distribution of the reinforcements, occurrence of side reactions at the reinforcement/molten metal interface), which results in deteriorating mechanical properties of the MMC materials thus made.

In the case of an Al/TiC composite, many reactions occur and up to three different compounds ($Al_3Ti$, $Al_4C_3$, and TiC) can coexist during the in situ manufacture of the composite. However, the occurrences and amplitudes of these reactions depend not only on the nature of the starting components and on the temperature at which the reaction is made, but also on the carbon content of the titanium carbide formed. The manufacture of such a composite is thus awkward.

By way of example, Nukami and Flemings describe in document [1] the in situ synthesis of aluminum matrix composites reinforced by TiC particles by solidification. More particularly, the composite is obtained by conducting the infiltration of an Al—Ti—C preform, obtained by compacting Al, Ti, C powders, by molten aluminum. Nukami and Flemings have thus observed the occurrence of several reactions during the composite synthesis, namely:

$$Ti_{(s)} + 3Al_{(s)} \rightarrow Al_3Ti_{(s)} \quad (1)$$

$$Al_{(s)} \rightarrow Al_{(l)} \quad (2)$$

$$Ti_{(s)} + 3Al_{(l)} \rightarrow Al_3Ti_{(s)} \quad (3)$$

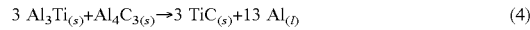

$$3\ Al_3Ti_{(s)} + Al_4C_{3(s)} \rightarrow 3\ TiC_{(s)} + 13\ Al_{(l)} \quad (4)$$

$$Al_3Ti_{(s)} + C_{(s)} \rightarrow TiC_{(s)} + 3\ Al_{(l)} \quad (5)$$

The Al/TiC composite can thus be manufactured in different ways according to different reaction pathways, with the consequence that it is difficult to control the chemical composition and the microstructure of the composite thus obtained.

Another way of obtaining an Al/TiC composite consists in milling the three base constituent elements, Al, Ti, C. The main advantage of this solution is that it enables the composite composition to be controlled, but the major drawback is that starting from more or less ductile compounds, there is a risk, besides that of powder bonding, of generating composition inhomogeneities within the composite obtained.

Finally, it can be contemplated to synthesize an Al/TiC composite by dispersing micro-sized TiC particles in aluminum, for example by co-milling aluminum with micro-sized TiC particles. But, if the mechanical properties (strength at break, Young's modulus, fatigue resistance) of the Al/TiC composite thus obtained are actually improved, this is made at the expense of the machinability of the materials, or even their surface quality, because of the particle size of reinforcements used which cause an accelerated wear of the cutting tools and torn materials.

To overcome this surface roughness problem, it has been suggested to decrease the size of the reinforcements and to use submicron-sized (that is lower than 1 μm and higher than 100 nm), or even nano-sized particles. However, it has been observed that, for composites resulting from the incorporation of nano-sized particles (these composites being called MMNC, N meaning "nano", or nanocomposites), the expected mechanical properties are not achieved as regards elongation at break. Indeed, for example in the case of Al/TiC, values of the elongation at break about 0.3% are obtained, whereas the low value of the minimum elongation at break required for the use of an MMC material is 3%. The cause of these poor results is likely to be related to the introduction of impurities in the composite, because of the use of nano-sized powders which are, by nature, extremely reactive. But, these impurities can give rise to secondary phases, which are located at the grain boundaries and which lead to a lessened mechanical behavior of the composite.

In view of the abovementioned drawbacks, the inventors have set themselves the aim of implementing a process for manufacturing a Al/TiC MMNC material having a very fine titanium carbide dispersion, which enables not only to reinforce the aluminum matrix, but also to ensure a very low surface roughness.

DISCLOSURE OF THE INVENTION

To do this, the inventors have implemented a process for preparing a Al/TiC nanocomposite material comprising an aluminum matrix in which nano-sized particles comprising TiC are dispersed, said process comprising the following steps of:

a) preparing a first powder mixture by contacting a graphite powder with a titanium aluminide powder of the formula $Al_3Ti$, both powders having micro- or higher sized particles;

b) preparing a second powder mixture by mechanosynthesis of the first powder mixture, the second powder mixture being formed in all or part by particles comprising both titanium aluminide and graphite;

c) compressing the second powder mixture to obtain one or more greens;

d) reactively sintering the green(s), thereby the Al/TiC nanocomposite material is obtained.

Within the scope of the present invention, by "nanocomposite", it is meant a composite having at least two phases and at least one of these phases having at least one nano-sized dimension. In the present case, these are the reinforcements (TiC particles) which are nano-sized.

Hereinbefore and hereinafter, the term "sized", applied to particles or crystallites, designates the greatest dimension of these grains or these crystallites. The term "nano-sized" means higher than or equal to 1 nm and lower or equal to 100 nanometers. The term "micro-sized" means higher than or equal to 1 micrometer and lower than 1 000 micrometers.

Besides, it is reminded that the term "particles" designates elements the ratio of the greatest dimension to the smallest dimension of which is lower than or equal to 2. The particles can thus be spherical or quasi-spherical, cubic or quasi-cubic, rhomboedral or quasi-rhomboedral, etc.

The process object of the invention is based on the combination of two complementary techniques which require no nano-sized raw material for making a nanocomposite material comprising an aluminum matrix reinforced by nano-sized titanium carbide (TiC) particles.

The first technique is a mechano-synthesis (also known as high energy mechanical milling or "mechanical alloying") the role of which is double: the purpose, on the one hand, is to homogenize at the finest possible scale the precursors, $Al_3Ti$ and C, for promoting the entire formation of the Al/TiC composite by a subsequent heat treatment (reactive sintering) and, on the other hand, to minimize the TiC amount formed during milling, since the presence of TiC grains, being very hard and very abrasive, causing an unavoidable contamination of the powder by elements from the milling device (for example, torn steel particles from the milling enclosure).

It is reminded that the mechano-synthesis technique consists in milling, in a mill or attritor type device, nano- or higher sized powders of a compound A (here, graphite) and a compound B (titanium aluminide $Al_3Ti$) for a sufficient time (often several hours) to try to obtain a closely mixed powder having a phase A and a phase B. In fact, during milling, there are alternating plastic deformations, fractures and bondings, such that the initial powders A and B can preserve their initial composition, or even make up a compound C at the end of milling (in this case, this is called a reactive mechano-synthesis).

At the end of step b), a second powder mixture all or part of the particles of which are formed by a graphite phase and a graphite aluminide phase $Al_3Ti$ (there is coexistence of both these phases within a same particle) is thus obtained. Preferably, within the particles, both these phases are closely mixed and the distribution of these two phases is homogeneous at the finest scale possible.

The second technique is a reactive sintering which aims at, on the one hand, forming the desired composite material and, on the other hand, densifying the material obtained to the maximum.

As regards step b) of preparing the second mixture, the mechano-synthesis can be made according to particular conditions.

The mechano-synthesis can be made for a duration between 24 and 48 hours and this duration is preferably equal to 36 hours.

The mechano-synthesis can be made in an enclosure of a milling device, said enclosure not being cooled during the mechano-synthesis. In fact, during milling, repeated chocks between particles or against the enclosure wall produce heat. If the enclosure is not cooled, the mechano-synthesis is thus made at a temperature higher than room temperature and can for example reach a temperature of 80° C.

The mechano-synthesis can be made in an enclosure of a milling device, this enclosure being provided with a rotor, which, during the mechano-synthesis, performs successive milling and deagglomeration cycles, the rotor rotating, at each cycle, at a first speed for a first duration during the milling phase of said cycle and at a second speed for a second period during the deagglomeration phase of said cycle, the first speed being at least 200 rpm higher than the second speed and the first duration being at least twice longer than the second duration. The first speed can be between 1,400 and 800 rpm and the second speed between 1,000 and 400 rpm. The first duration can be between 1 and 5 minutes and the second duration between 20 seconds and 3 minutes.

The mechano-synthesis can be made in an enclosure of a milling device, said enclosure being filled between 15 and 30% of its volume, preferably 25%.

According to a possible alternative of the invention, when the enclosure of the milling device includes milling balls, the ratio of the volume of the first powder mixture to the volume of the milling balls is preferably between 5 and 12%.

Preferably, the second powder mixture comprises at most 35 weight % of TiC.

As regards the step c) of compressing the second mixture, it can for example be a pelletization to obtain one or more pellets. Anyway, the compression of the second mixture can comprise placing the second mixture into a mould having an adapted shape to form one or more greens and applying an uniaxial pressing or cold isostatic pressing to the contents of said mould.

As regards the sintering step d), it can be made at a temperature between 900° C. and 1,400° C.

It can be made for a duration between 1 and 15 minutes. Of course, the sintering duration is meant as the duration from when the sintering temperature is reached.

The sintering temperature can be reached by heating the green(s) at a rate between 100° C./min and 400° C./min. This heating rate is preferably at least 300° C./min. A quick heating rate enable the grains (crystallites) growth to be restricted, while preserving the material densification. It is set forth that the cooling rate is preferably identical or substantially identical (more or less 5%) to the heating rate.

Preferably, the sintering is made at a temperature of 1 000° C. and for a duration between 1 and 5 minutes, the sintering temperature being reached by heating the green(s) at a rate of 300° C./min.

Preferably, the process according to the invention further comprises, after step b) and before step c), a step of sieving the second powder mixture, to select the particles having a size between 50 and 200 micrometers.

The materials obtained according to the process object of the invention have numerous advantages.

The process according to the invention enables to obtain nanocomposites having an elongation at break close to 7%, which is much better than that obtained by nanocomposites of prior art obtained by introducing a dispersed phase of micro-sized carbide into aluminum, that have trouble in reaching the low value of elongation at break required for the use of MMC, which is 3%.

On the other hand, the process according to the invention has the advantage not to use nano-sized powders upon manufacturing the MMNC, which is a major advantage regarding drastic requirements for the use of nano-sized materials in industry (dissemination, pyrophoricity . . . ). In the process provided, starting products are micro- or higher sized (preferably micro-sized, but higher than 100 μm). The nanostructuration occurs in situ during the final heat treatment, which removes any risk related to the use of nano-sized particles.

The process according to the invention enables to obtain a dense composite material, having a low surface roughness, combining lightness and good thermomechanical properties and which has improved shapability (in particular machinability). Such a material can be used in aeronautics and in the car industry, for example for making pistons for combustion engines.

Further characteristics and advantages of the invention will appear upon reading the further description that follows and which relates to a particular embodiment of an Al/TiC nanocomposite material according to the process object of the invention.

Of course, this further description is only given by way of illustration of the invention and is not a limitation thereof in any way.

DETAILED DISCLOSURE OF PARTICULAR EMBODIMENTS

Figure 1:
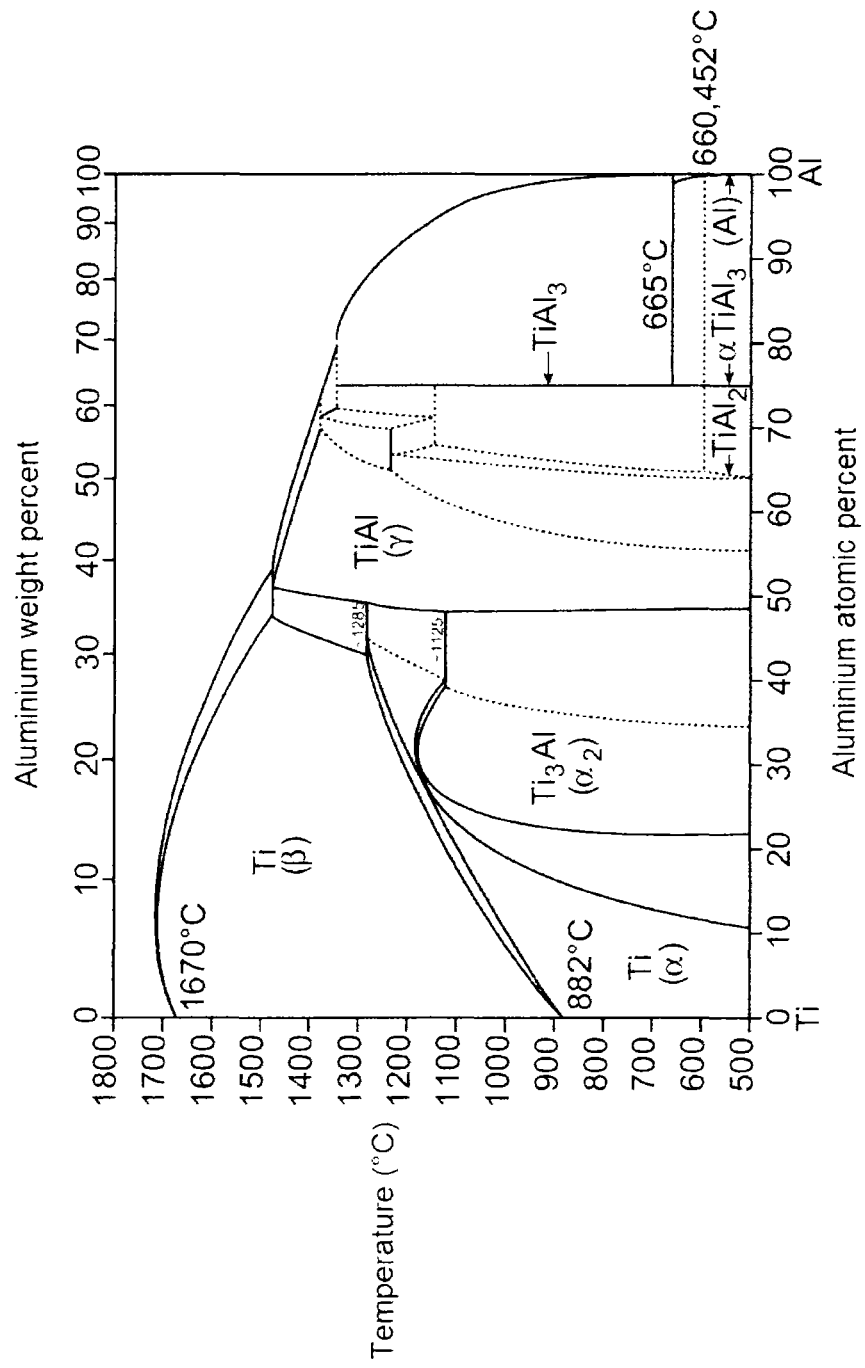
FIG. 1 represents a phase diagram of the titanium-aluminum system, found in document [2].

In order to illustrate the process object of the invention, the steps to follow for making an Al/TiC nanocomposite material will now be described in detail.

According to the invention, the nanocomposite material is obtained according to the following reaction:

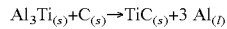

This reaction corresponds to the reaction (5) as mentioned by Nukami and Flemings in document [1]. The reaction (4) as mentioned in this document allows, in theory, to achieve an Al/TiC composite too.

Thermodynamic calculations show that the reaction (4) is easily made from 777° C. (1,050 K), whereas the reaction (5) is possible irrespective of the temperature.

Therefore, it appears that the Al/TiC composite can be manufactured in different ways according to different reaction pathways. It also appears that the reaction (5) could be quite feasible by high energy milling.

However, although milling can result in the nearly full formation of an Al/TiC composite according to the reaction (5), the milling is used, within the scope of the present invention, to mix at the finest scale possible the different components and minimize the contamination by milling tools. The reaction (5) really starts only during the heat treatment of reactive sintering and leads to the formation of the Al/TiC composite. As the $Al_3Ti$ and C phases have been dispersed homogeneously during milling, the reactive sintering enables an Al/TiC nanocomposite having nano-sized TiC reinforcements to be obtained.

To perform a high energy milling within the scope of the present invention, an attritor type high energy mill is used. It is herein a Simoloyer® CM01, provided by the manufacturer Zoz GmbH. This mill has a horizontal axis of rotation, and a milling chamber with a volume of 0.5 L enabling between 15 and 50 g of powder to be produced with 1 000 to 2 000 g of balls (100C6 balls). In this mill, it is possible to vary the speeds and durations of rotation in order to restrict agglomeration of the powders during milling. Finally, various equipments enable milling to be performed under a controlled atmosphere (rough vacuum or gas).

Milling Conditions

In order to determine the best milling conditions enabling as close as possible a mixture of $Al_3Ti$ and C to be generated and pollution by the milling tools to be minimized, factorial experiments have been implemented involving five parameters for the mill.

Two of the five parameters involve the amount of powder introduced in the mill. It is the filling rate of the milling chamber (enclosure) and the ratio between the volume of the powder and the volume of the balls introduced.

Two other parameters are related to the milling cycle: the durations of the plateaus at the two different speeds at which the rotor rotates upon milling, a first speed during the milling phase and a second speed, lower than the first speed, during the deagglomeration phase. These speeds are arbitrarily chosen equal to 1,200 and 800 rpm.

Finally, the last parameter varying during the different tests is the milling temperature.

The factorial experiments consist in making all the possible combinations between the different factors considered.

In the present case, there are five factors with two levels, since each parameter can assume two values; therefore $2^5$, namely 32 tests, must be made.

The experiments thus enable the effects of all the factors to be measured and the interactions between these factors to be taken into account.

From these factorial experiments with five factors having two levels, fractional experiments have been determined by keeping only the tests for which the five-order interaction, namely between the 5 parameters, is at the level one. These experiments reduce the number of tests to 16.

The values of the levels of each of the factors have been defined as follows:

Filling Rate of the Enclosure

The two values chosen to be tested are 15 and 25%. The lowest value corresponds to the filling rate recommended by the mill manufacturer during millings performed in a similar mill provided with a 2-liter enclosure.

Ratio of the Powder and Balls Volumes: $V_P/V_B$

Both values chosen to be tested correspond to a powder volume used of 5 and 12% of the balls volume used.

As for the filling rate, the value recommended by the manufacturer (5%) acts as a reference.

Durations of the Rotation Speeds (Plateaus)

Milling is made according to n cycles, each cycle comprising a milling phase, made at a first speed, and a deagglomeration phase, made at another speed, less quick than the first speed.

The durations of each phase of the n cycles have been arbitrarily defined equal to two or four minutes for the high speed and thirty seconds or two minutes for the low speed, which is intended to act mainly to "shutdown" the milling cycle (fracturation, welding) and thus promote particle deagglomeration.

Milling Temperature

The milling temperature is not strictly the parameter considered since the mill is not equipped with any regulation system. However, it is provided with a system for cooling the enclosure by a water circulation between both walls of the enclosure. By virtue of the water circulation, the temperature is equilibrated at about 25° C. The implementation of a heating tape driven by a temperature regulating device, for example a Eurotherm type device, enables the enclosure to be heated up to 80° C. The milling is thereby chosen to be tested at 25° C. and at 80° C.

The results obtained highlight the essential role of the ratio $V_P/V_B$ and the filling rate. Thus, in the light of the results obtained, it seems that it is preferable to use a high ratio $V_P/V_B$ (12% rather than 5%) to avoid a strong contamination and to use a high filling rate (25% rather than 15%) to promote reaction progress.

When both these factors are set, it seems preferable, to limit contamination, not to cool the enclosure (80° C. rather than 25° C.) and to use a milling cycle made of short plateaus (the first speed at 800 rpm having a plateau of 2 min and the second speed 1 200 rpm having a plateau of 30 s). In fact, the plateaus are used to improve the reaction yield and, to a lesser extent, to promote reaction progress.

The interpretation of the results of the sixteen millings performed has allowed to define, among the chosen values, which values enable optimum milling conditions to be obtained to promote mixing and restrict contamination. However, it is highly probable that better milling conditions could be defined by using other level values than those used in the factorial experiments.

Using these optimum milling conditions, at the end of the milling, a powder consisting of about 2.7 aluminum atoms per a titanium atom is obtained, which corresponds to the mean obtained for the sixteen millings.

Preparing the Mixture

Carbon exists as three allotropic forms: graphite, fullerene, and diamond carbon. Within the scope of the present invention, graphite is used as a carbon source for synthesizing TiC. The solid lubricant property of the graphite is thus exploited, due to its structure in leaflets, to restrict bounding of the metal powder to the walls of the enclosure upon milling.

In order to avoid an oxygen contamination, it is preferable that the graphite powder undergoes a high temperature degassing heat treatment before being introduced in the milling enclosure.

As regards $Al_3Ti$, the choice of this intermetallic is justified by its fragile character, which enables it to be more easily mixed with graphite during milling and to minimize contamination. The choice of $Al_3Ti$ is on the other hand justified by the fact that this intermetallic is, as can be observed on the equilibrium diagram Al—Ti (FIG. 1), the aluminum-richest intermetallic compound.

The compound $Al_3Ti$ can crystallize as three crystallographic phases: $D0_{22}$, $D0_{23}$, and $L1_2$.

Calculations of electronic structure predict a greater stability in the phase $D0_{23}$, followed by phase $D0_{22}$ and phase $L1_2$. However, this stability very strongly depends on the atomic environment, relaxation effects and crystal seeding mode. In fact, experimentally, it is mainly the phase $D0_{22}$ that is most frequently found. Thus, to form the $Al_3Ti$ powder which is used as a starting powder in the process according to the invention, $Al_3Ti$ ingots which only contain (or at a vast majority) the phase $D0_{22}$ are used.

In this exemplary embodiment, a micro-sized graphite powder (100 μm in size) is used, provided by Mersen (formerly Carbone Lorraine) which is previously degassed under a secondary vacuum at 1,000° C. for 12 h and an $Al_3Ti$ powder obtained by grinding $Al_3Ti$ ingots $D0_{22}$ so as to obtain nuggets having sizes lower than 800 μm.

Both these powders are then weighed in stoechiometric proportions to obtain a mixture leading to the following reaction after sintering:

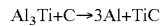

$$Al_3Ti+C \rightarrow 3Al+TiC$$

Milling

As has been seen previously, it is preferable to use a ratio $V_P/V_B$ equal to 12%, rather than a ratio equal to 5%, and a filling rate of 25% rather than 15%.

Since the mill enclosure that it is used has a volume of 0.5 L, the mass of the powders introduced into the milling chamber is thus 63 g, whereas the mass of the balls is 1 261.7 g.

The enclosure temperature is held at 80° C. throughout the milling duration.

The other milling parameters are the following ones. The mill rotor makes n cycles each of:
- 900 rpm for 2 min 30 s (milling phase);
- 600 rpm for 30 s (deagglomeration phase).

The high energy mechanosynthesis or milling must be made for a sufficient time to obtain a closely mixed powder having an $Al_3Ti$ phase and a C phase. The time required for milling is several hours.

In this exemplary embodiment, two millings under argon have being performed in the above set out milling conditions for two different milling durations: a first milling for 24 hours and a second milling for 48 hours.

At the end of the milling time, the composition of both powders has been analyzed by the X-ray diffraction technique (X-ray diffractometry technique or DRX, this technique enabling to determine the nature of the phases crystallized).

By investigating the DRX pattern obtained with this milled powder (FIG. 2A), this milling duration seems, in the first place, to come up to our expectations. Indeed, it is observed, on the one hand, that the synthesis reaction of TiC is poorly advanced and, on the other hand, that the iron contamination remains low: by conducting a microprobe analysis of the milled powder, it is learnt that the iron content of the powder is 0.07%. Furthermore, the milling yield is good: 75%. However, the different sinterings made thereafter show that the material obtained is poorly homogenous.

As regards the 48-hour milling (FIG. 2B), it is reactive enough: the high TiC amount formed during milling promotes the iron contamination of the final material: 0.36% (microprobe). Furthermore, a significant fraction of the powder (30%) remained bonded to the walls of the milling enclosure. After sintering, the composition analysis results obtained with the microprobe show that the sintered material obtained from the powder milled for 48 hours has a much better homogeneity than the sintered material obtained with the powder milled for 24 hours.

Figure 2A:
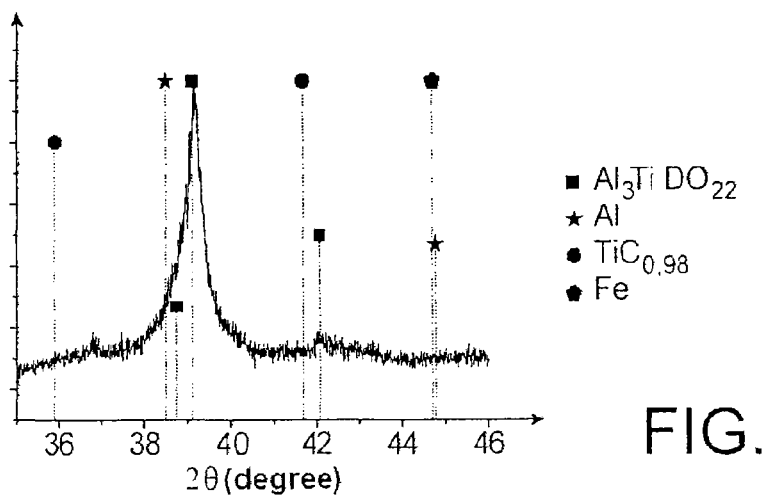
FIGS. 2A and 2B represent X-ray diffraction patterns of the Al3Ti and C powders milled at 80° C. under argon for milling durations of 24 hours (FIG. 2A) and 48 hours (FIG. 2B).
Figure 2B:
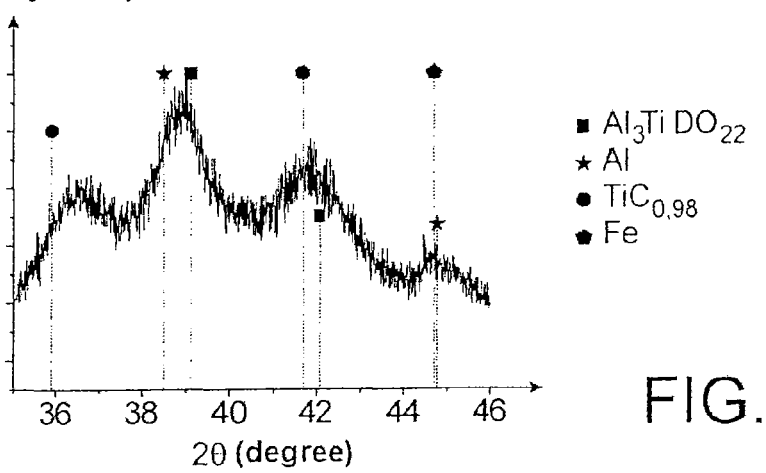

It is to be noted that in FIGS. 2A and 2B, the diffraction peaks ascribed to TiC are strongly offset with respect to the theoretical values of $TiC_{0.98}$. This offset seems to be the hallmark of a titanium oxide carbide Ti(CO) the crystal structure of which is identical to that of TiC. Its stability is not high, which explains why it disappears during the subsequent sintering treatment.

In view of the results obtained, it is chosen to make a 36-hour milling, which seems to be the best trade-off to obtain a powder not much contaminated by the materials of the mill (in particular iron) and an homogeneous sintered material.

Sieving

The powder milled for 36 hours is preferably sieved in order to select the powder having a particle size between 50 and 200 μm.

Compacting

The powder milled for 36 hours, possibly sieved, is then compacted as pellets. For example, a single effect uniaxial compacting (2 GPa) or a cold isostatic compression (CIF) of the milled powder, which is degassed beforehand, can for example be conducted. This degassing enables the formation of porosities to be avoided during compacting.

Thus, pellets having an 8 mm diameter with a relative density of about 80% are obtained.

Reactive Sintering

Determining the Sintering Temperature

The sintering temperature has to allow both full formation of titanium carbide and densification of Al/TiC.

In literature, this sintering temperature is between ⅔ and ¾ the melting temperature of the major compound in a mixture. In the present case, this melting temperature is about 1,370° C. Three sintering temperatures have therefore been tested using a dilatometer on the pellets of the powder milled for 36 hours: 900° C., 950° C. and 1,000° C.

Figure 3:
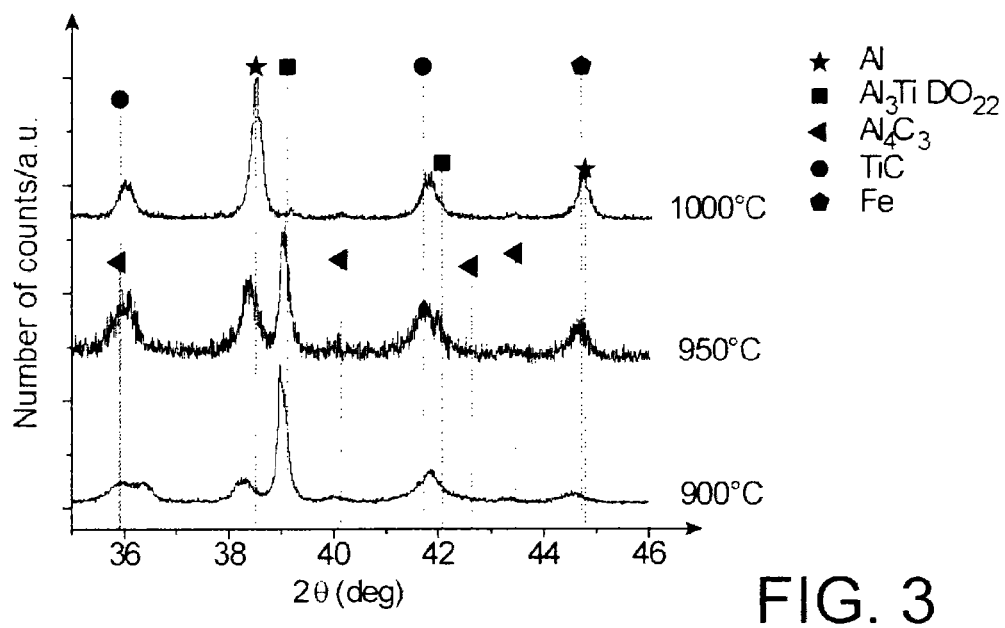
FIG. 3 represents X-ray diffraction patterns made on powder pellets milled for 36 hours, that have undergone a sintering at a temperature of 900° C., 950° C. and 1 000° C.

For these tests, the heating rate is 100° C./min and the sample is held 15 minutes in a plateau, and then cooled at 100° C./min. Then, the X-ray diffractometry (DRX) is used in order to analyze the phases present in the sintered material (FIG. 3).

At 900° C., it is observed that the reaction is not complete: the phase $D0_{22}$ is the major phase and the TiC lines appear.

At 950° C., the aluminum is the major phase and the oxycarbide phase (Ti—O—C) has nearly disappeared in favor of titanium carbide.

Finally, at 1 000° C., the reaction seems total. The trace of the phase $D0_{22}$ is observed.

Among these three sintering temperatures, the 1,000° C. temperature seems preferable.

Determining the Temperature Raise Rate

The behavior of the milled compacted powder is different depending on the heating rate used and reveals different phenomena which have a consequence on the final microstructure of the sintered material.

Besides the formation of the TiC carbide at about 900° C., the significant grain growth of the phase $D0_{23}$ at about 400° C. is also a major event that has to be taken into account since it results in losing the powder nanostructure and implies a restricted subsequent reactivity of aluminide with graphite.

Besides, it is established that at about 800° C., titanium carbide being present is decomposed in contact with liquid aluminum to form aluminum carbide ($Al_4C_3$) and the phase $D0_{22}$ (document [3]).

Both these events, if developed, thus risk to prevent the total reaction between $Al_3Ti$ and C.

Therefore, three 15-minute sintering cycles at 1 000° C. have been tested with three distinct heating rates, namely 10° C./min, 100° C./min and 300° C./min, and their effects on the reaction progress, TiC particle size and phase distribution have been observed.

Particle Size

The assessment of the aluminum and titanium carbide particle size from the X-ray patterns (Scherrer formula) enables the effect of the heating rate on the particle size to be accounted for.

The results are given in the table below, which gives the size of Al and TiC crystallites as function of the temperature rise rate.

By analyzing these results, it appears that, among the heating rates tested, the higher the heating rate, the smaller the crystallite size. These results agree with the seeding theory.

| Crystallites size | 10° C./min | 100° C./min | 300° C./min |
| --- | --- | --- | --- |
| Al | 36 nm | 34 nm | 25 nm |
| TiC | 25 nm | 22 nm | 13 nm |

Reaction Progress

Figure 4:
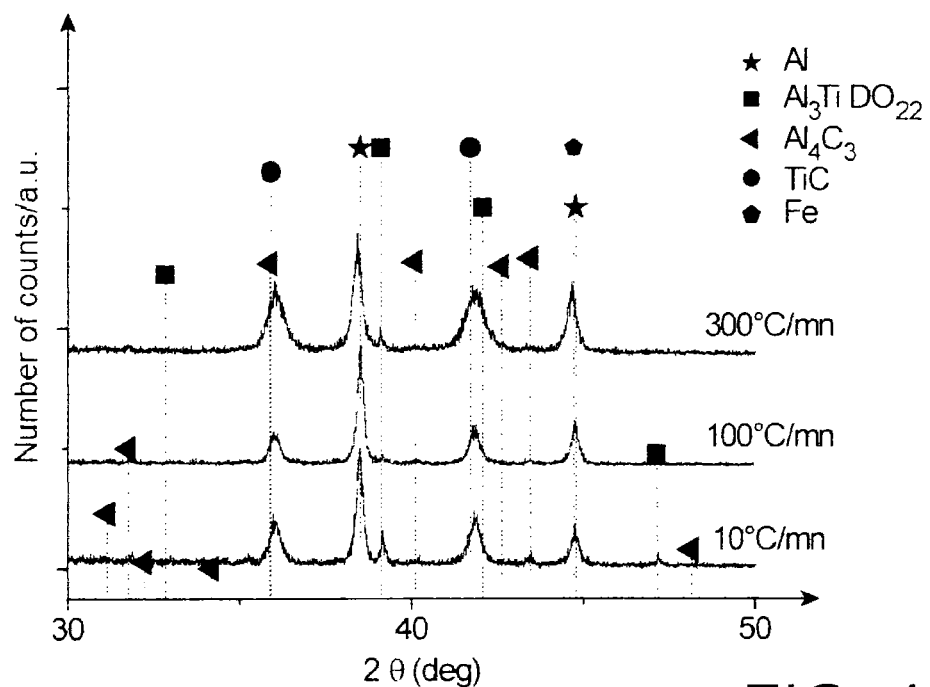
FIG. 4 represents X-ray diffraction patterns made on powder pellets milled for 36 hours, that have undergone a sintering at a temperature of 1 000° C. for 15 minutes under argon with a heating rate (that is a temperature rise rate) of 10° C./min, 100° C./min and 300° C./min.

The X-ray patterns of samples heated at 10° C./min, 100° C./min and 300° C./min are given in FIG. 4.

It is observed that the sample heated at 10° C./min clearly contains a significant fraction of phase $D0_{22}$ and an important amount of aluminum carbide.

For higher heating rates, the results are less clear: no secondary phases are observed for a heating rate of 100° C./min, whereas a low fraction of $D0_{22}$ is present in the sample heated at 300° C./min.

In view of the results, a heating rate of 300° C./min is preferably used, which promotes the finest microstructure.

Determining the Plateau Duration

If a sample of milled and compacted powder is held at a temperature higher than the melting temperature of aluminum, it can be the location of undesirable reactions leading to the formation of secondary phases, the nature of these phases depending on the stoechiometry of the titanium carbide. However, if the thermodynamic conditions are met to allow for these reactions, their progress degree is controlled by kinetics. Thereby, it will be attempted to determine the optimum plateau duration at 1 000° C. necessary to form an Al/TiC nanocomposite and restrict the formation of these secondary phases.

Three plateau durations have been investigated: 1 min, 5 min, and 15 min, the heating rate being 300° C./min and the plateau temperature being set to 1,000° C.

Figure 5A:
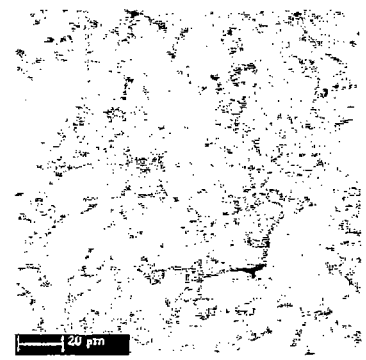
FIGS. 5A, 5B and 5C are images obtained using a backscatter electron (BSE) detector of the sintered materials obtained after an annealing at 1 000° C. at 300° C./min for 1 minute (FIG. 5A), for 5 minutes (FIG. 5B), and for 15 minutes (FIG. 5C).
Figure 5B:
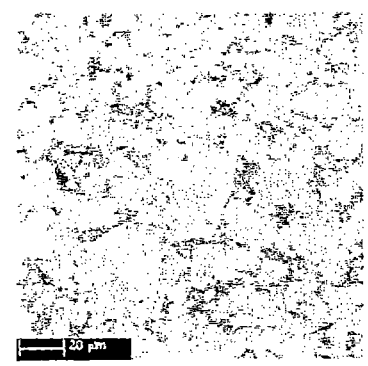
Figure 5C:
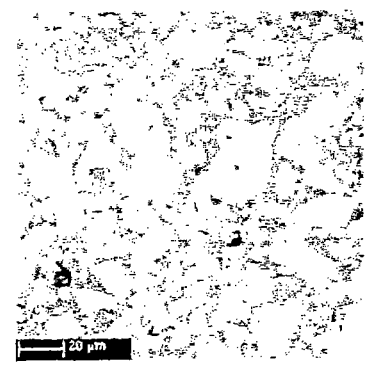

FIGS. 5A, 5B and 5C show the evolution of the microstructure over the annealing time.

It turns out that for a 1 minute plateau, the microstructure is the most homogeneous. Indeed, for a very short annealing, TiC rich Al/TiC zones are more numerous and the set is much more homogeneous than for longer plateau durations.

Conclusion on the Optimum Conditions for Sintering

The "ideal" heat treatment among the values tested would thereby be an annealing with a temperature rise rate of 300° C./min, at 1 000° C., for 1 minute.

By this method, a material comprising nano-sized particles of titanium carbide coated in an aluminum matrix is obtained. The typical microstructure is mainly made of micro-sized domains of aluminum being rich in nano-sized TiC particles, coexisting with TiC-depleted domains; all these domains being separated by pure aluminum threads. A homogenous and very poorly iron-contaminated Al/TiC nanocomposite material is thus actually obtained.

The specific gravity of the sintered material is 3.07, which corresponds to about 91% of the theoretical specific gravity.

REFERENCES CITED

[1] Nukami and Flemings
"In Situ Synthesis of TiC Particulate-Reinforced Aluminum Matrix Composites", Metallurgical and Materials Transactions A, Volume 26A, pages 1877-1884, July (1995).
[2] Murray
"*Metallurgical and Materials Transactions*", 19 (1988), page 243.
[3] Viala et al.
"*Diffusion Paths and Reaction Mechanisms in the High-Temperature Chemical Interaction Between Carbon and Titanium Aluminides*", Mater. Sci. Eng. A, 203 (1995), pages 222-237.

The invention claimed is:

1. A process for preparing a Al/TiC nanocomposite material comprising an aluminum matrix in which nano-sized particles comprising TiC are dispersed, the process comprising:
    contacting a graphite powder with a titanium aluminide powder of the formula $Al_3Ti$, both powders having micro- or higher sized particles, thereby obtaining a first powder mixture;
    performing a mechanosynthesis of the first powder mixture to have a mechanical alloying of the first powder mixture, thereby obtaining a second powder mixture, wherein all or part of particles of the second powder mixture comprise both a titanium aluminide phase and a graphite phase;
    compressing the second powder mixture to obtain one or more greens; and
    performing a reactive sintering of the green(s), thereby obtaining the Al/TiC nanocomposite material,
    wherein the mechanosynthesis is performed in an enclosure of a milling device, the enclosure being provided with a rotor which, during the mechanosynthesis, carries out successive cycles, each cycle having a milling phase and a deagglomeration phase, the rotor rotating, at each cycle, at a first speed during a first duration during the milling phase of the cycle and at a second speed during a second duration during the deagglomeration phase of the cycle, the first speed being at least 200 rpm higher than the second speed and the first duration being at least twice as long as the second duration.

2. The process according to claim 1, wherein the mechanosynthesis is performed for a duration comprised between 24 and 48 hours.

3. The process according to claim 1, wherein the mechanosynthesis is performed in an enclosure of a milling device, the enclosure being not cooled during the mechanosynthesis.

4. The process according to claim 1, wherein the first speed is between 1,400 and 800 rpm and the second speed is between 1,000 and 400 rpm.

5. The process according to claim 1, wherein the first duration is between 1 and 5 minutes.

6. The process according to claim 1, wherein the mechanosynthesis is performed in an enclosure of a milling device, the enclosure being filled to between 15 and 30% of its volume.

7. The process according to claim 6, wherein the enclosure includes milling balls and a ratio of volume of the first powder mixture to volume of the milling balls is between 5 and 12%.

8. The method according to claim 1, wherein the second powder mixture comprises at most 35 weight % of TiC.

9. The process according to claim 1, wherein the reactive sintering is performed at a temperature between 900° C. and 1,400° C.

10. The process according to claim 9, wherein the reactive sintering is performed for a duration between 1 and 15 minutes.

11. The process according to claim 9, wherein the reactive sintering temperature is reached by heating the green(s) at a rate between 100° C./min and 400° C./min.

12. The process according to claim 1, wherein the reactive sintering is performed at a temperature of 1,000° C. and for a duration between 1 and 5 minutes, the temperature being reached by heating the green(s) at a rate of 300° C./min.

13. The process according to claim 1, further comprising, after obtaining a second powder mixture and before compressing the second powder mixture, sieving the second powder mixture, to select particles having a size between 50 and 200 micrometers.

14. The process according to claim 1, wherein the mechanosynthesis is performed for a duration equal to 36 hours.

15. The process according to claim 1, wherein the second duration is comprised between 20 seconds and 3 minutes.

* * * * *